Figure 1:
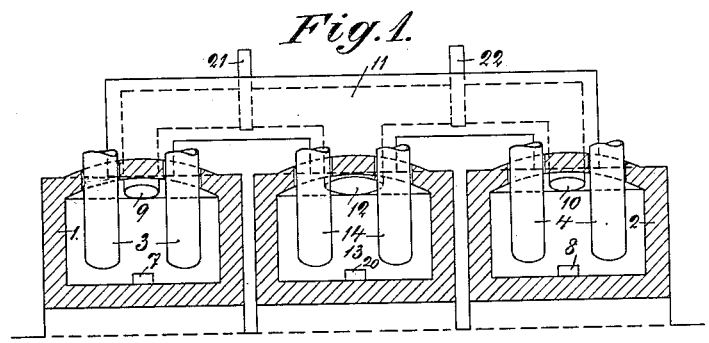

E. S. BERGLUND.
ELECTROTHERMIC EXTRACTION OF ZINC.
APPLICATION FILED JULY 25, 1917.

1,271,267.

Patented July 2, 1918.

WITNESSES
George E. Clarke
Stewart L. Whitman

Edward S. Berglund
INVENTOR
by Albert E. Parker
ATTORNEY

UNITED STATES PATENT OFFICE.

EDWARD SALOMON BERGLUND, OF TROLLHÄTTAN, SWEDEN.

ELECTROTHERMIC EXTRACTION OF ZINC.

1,271,267.

Specification of Letters Patent. Patented July 2, 1918.

Application filed July 25, 1917. Serial No. 182,714.

*To all whom it may concern:*

Be it known that I, EDWARD SALOMON BERGLUND, engineer, a subject of the King of Sweden, residing at Trollhättan, Sweden, have invented new and useful Improvements in Electrothermic Extraction of Zinc, of which the following is a specification.

In the extraction of zinc in electrical way the condensation of the zinc vapors to fluid zinc causes great troubles, as known. Such condensation is dependent on the temperature of the condenser as well as of the composition and concentration of the vapors. As long as the generation of vapors in the electrical furnace proceeds continuously and uniformly and the condenser has a temperature corresponding to the concentration of the vapors generated, fluid zinc is condensed in the condenser to the extent which is possible during the present conditions. But if by any reason the generation of vapors in the smelting furnace must be interrupted, poussière or zinc powder instead of fluid zinc is condensed in the condenser from the vapors, generated in the smelting furnace owing to the remaining heat in the same after the said interruption has taken place. This circumstance is a result of the fact, that the temperature in the condenser decreases when the continuous working of the furnace is interrupted, partly because the amount of vapors flowing to the condenser is diminished, partly because the vapors, entering the condenser, have a temperature more and more decreasing, and partly because said vapors contain an amount of zinc, more and more decreasing, which is condensed in the condenser, and consequently an amount of heat, more and more decreasing, is delivered by the vapors during the condensation. All these circumstances make it impossible to condense the vapors to fluid zinc, so that instead thereof a corresponding amount of poussière or zinc powder is generated, which is very difficult and troublesome to smelt together to fluid zinc, as well known.

The present invention has for object to avoid or at least to diminish said inconvenience, and consists in conducting zinc containing vapors during the normal working simultaneously from two or more smelting furnaces to a common condenser, and to couple said smelting furnaces together with the common condenser in such a way, that one or more of said smelting furnaces, say for inspection, may be shut out of working without disturbing the working of the remaining furnace or furnaces, so that always at least one furnace delivers vapors to the condenser. When interrupting one or more furnaces the amount of vapors flowing to the condenser, of course will be diminished accordingly, but the concentration of the vapors however will be maintained constant, whereby the generation of poussière or zinc powder in the condenser will be diminished at least as much as possible during the present conditions.

The condensation will be further facilitated by conducting the vapors from the working furnace or furnaces, before entering the condenser, to and through a vapor gathering chamber, in which the temperature of the vapors is regulated, so that they receive the temperature, which is proper to the condensation. In said chamber the vapors may also be purified and reduced.

For making the invention more intelligible an embodiment of a furnace and condensation system, by means of which the method above described may be carried out, is illustrated on the accompanying drawing.

Figure 2:
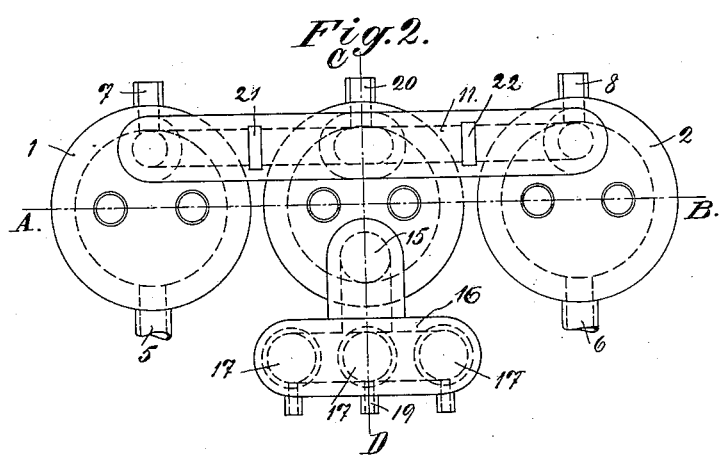
Figure 3:
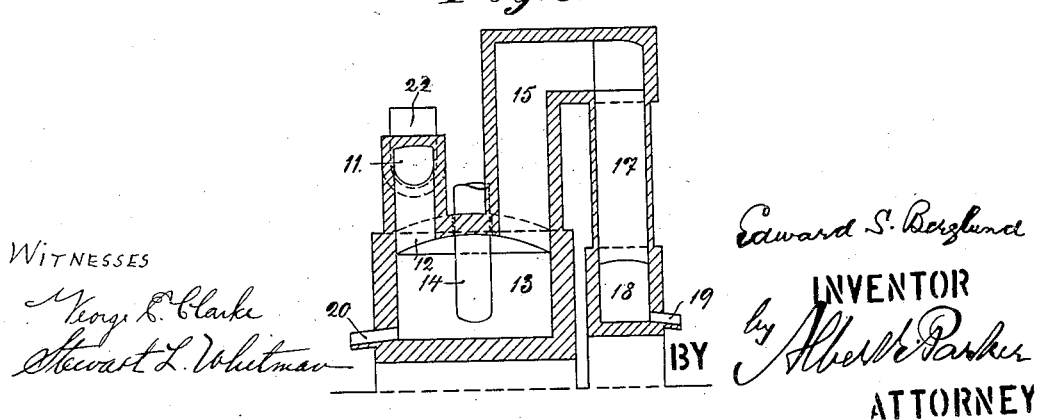

Figure 1 is a vertical longitudinal section of the furnace arrangement on line A—B in Fig. 2, Fig. 2 is a plan of Fig. 1, and Fig. 3 is a vertical transverse section on line C—D in Fig. 2.

1 and 2 indicate schematically two smelting furnaces for smelting zinc containing material electrically, whereby 3, 4 indicate the electrodes, 5, 6 the openings for introducing the material in question, 7, 8 slag tapping openings and 9, 10 escape openings for the zinc containing vapors, generated in the furnaces.

A gas channel 11, communicating with said escape openings, opens at 12 in a chamber 13, which in the construction shown, has the same form as the smelting chamber of the smelting furnaces 1, 2, and which is provided with electrodes 14 for heating the chamber, and also with a gas escape 15, communicating with a condenser 16. 17 indicates the condenser pipes, opening below in a common chamber 18, provided with tapping holes 19. 20 indicates a slag tapping hole of the chamber 13.

The escaping gas of the smelting furnaces 1, 2, may be cut off from the communication with the gas gathering chamber 13 with the aid of movable disks 21, 22, which are inserted from above through openings transversely to the channel 11, and are placed between the escape openings 9 or 10 and the inlet opening 12.

Thus it is possible, when the working of either of the furnaces 1 or 2 is interrupted, to cut off the flow of vapors from said furnace to the gas gathering chamber 13 and the condenser 16 without disturbing the working of the other furnace.

It is evident, that the condenser 16, when the working of one of the furnaces is interrupted will receive from the other furnace vapors with the same degree of concentration as the vapors from the two simultaneously working furnaces, whereby the conditions for condensation to fluid zinc still are present. In the chamber 13 the temperature of the vapors flowing through the chamber may be regulated by means of the supply of current to the electrodes 14, so that the vapors receive the temperature suitable for the condensation. By placing a layer of glowing carbon in the chamber 13 the vapors flowing through said chamber may be purified, and the carbon dioxid contained in said vapors, may be reduced to carbon monoxid.

Although only two smelting furnaces 1 and 2 are shown on the drawing, more such furnaces may be employed if desired, each of the vapor escapes of which is connected with a common vapor gathering chamber 13, communicating with a common condenser 16. Said vapor gathering chamber 13 may also be omitted, if wished, the escapes from the smelting furnaces in such case communicating directly with the condenser 16.

What I claim is:

1. In electrothermic extraction of zinc, conducting zinc containing vapors simultaneously from several smelting furnaces to one common condenser, and shutting off the communication from one of the said smelting furnaces without disturbing the working of the remaining furnaces.

2. In electro-thermic extraction of zinc, conducting zinc containing vapors from several smelting furnaces during normal working of the extraction simultaneously to one common condenser, shutting off the communication from one of said smelting furnaces to the condenser for inspection of the furnace without disturbing the working of the remaining furnaces, and condensing the vapors escaping from said remaining furnaces.

3. In electrothermic extraction of zinc, conducting zinc containing vapors simultaneously from several smelting furnaces to a vapor heating and purifying chamber, shutting off communication from one of said smelting furnaces without disturbing the working of the remaining furnaces and delivering the vapors from said chamber to a common condenser.

4. In combination several electric smelting furnaces a vapor escape from each of said furnaces, connected with a common condenser and means for shutting off each of said escapes from said condenser.

5. In combination several electric smelting furnaces, a vapor escape from each of said furnaces, a chamber, connected with said vapor escapes, means for adjustably heating said chamber, means for shutting off each of said escapes from said furnaces, and means for connecting said chamber with a common condenser.

In testimony whereof I have signed my name to this specification in the presence of two subscribing witnesses.

EDWARD SALOMON BERGLUND.

Witnesses:
 HUGO LINDBORG,
 BERNH. ORSELL.